United States Patent [19]

Milne

[11] 4,193,830
[45] Mar. 18, 1980

[54] METHOD OF SURFACE LAMINATING

[75] Inventor: James A. Milne, Wheeling, Ill.

[73] Assignee: Pace Incorporated, Northbrook, Ill.

[21] Appl. No.: 860,839

[22] Filed: Dec. 15, 1977

Related U.S. Application Data

[62] Division of Ser. No. 723,026, Sep. 13, 1976, abandoned.

[51] Int. Cl.² .............................. C09J 5/06; C09J 7/00
[52] U.S. Cl. .................................. 156/306; 156/311; 156/312; 156/313; 156/320
[58] Field of Search ............... 156/309, 311, 312, 313, 156/322, 324, 498, 499, 583, 306, 320; 100/92, 93 RP, 93 P, 38, 144, 151, 152; 425/363, 364, 384, 394, 407, 445

[56] References Cited

U.S. PATENT DOCUMENTS

| 2,163,648 | 6/1939 | Watkins et al. | 156/311 |
|---|---|---|---|
| 2,518,806 | 8/1950 | Muench | 100/92 |
| 2,861,002 | 11/1958 | Britton | 156/311 |
| 3,011,932 | 12/1961 | Downing | 156/498 |
| 3,223,027 | 12/1965 | Soda et al. | 156/498 |
| 3,283,052 | 11/1966 | Mink | 264/248 |
| 3,471,600 | 10/1969 | Meek | 425/384 |
| 3,547,742 | 12/1970 | Cottrell | 156/311 |
| 3,721,597 | 3/1973 | Colburn | 156/313 |
| 3,753,832 | 8/1973 | Venezlale | 156/499 |
| 3,770,550 | 11/1973 | Levitan | 156/498 |
| 3,901,758 | 8/1975 | Humphries | 156/499 |

Primary Examiner—Caleb Weston
Attorney, Agent, or Firm—Wegner, Stellman, McCord, Wiles & Wood

[57] ABSTRACT

A system is disclosed for laminating surfacing materials, such as high and low pressure laminates, paper, wood veneers, metal foils and the like to core material, such as plywood, particle board, flake board, hard board, rigid plastic foams and the like.

The disclosure includes a machine and a method of laminating, particularly utilizing high viscosity, hot melt adhesives. A sandwich is formed at ambient temperature with the adhesive between the laminate and core either as sheet material or precoated on the laminate or the core. The method employs a progressive heating of the adhesive and adjacent parts of the sandwich from ambient temperature through tackiness to an activating temperature followed immediately by a physical migration of the adhesive to wet out adjacent surfaces followed by a cooling of the sandwich to a mechanical bonding adhesive temperature. The machine is particularly useful in installations for laminating wherein it is desired to avoid the difficulties of melting and applying hot melt adhesives and controlling the necessary conditions thereof.

5 Claims, 6 Drawing Figures

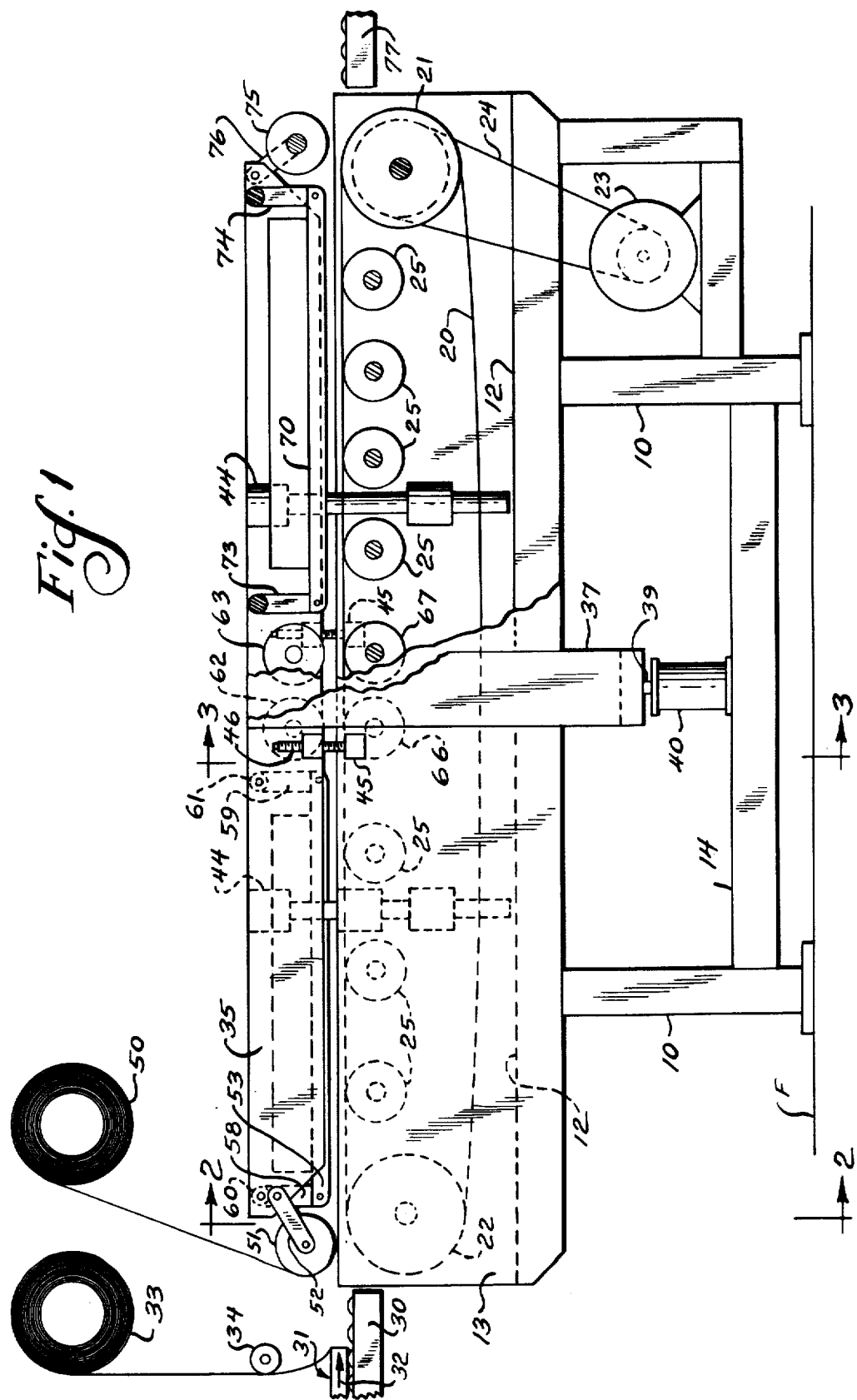

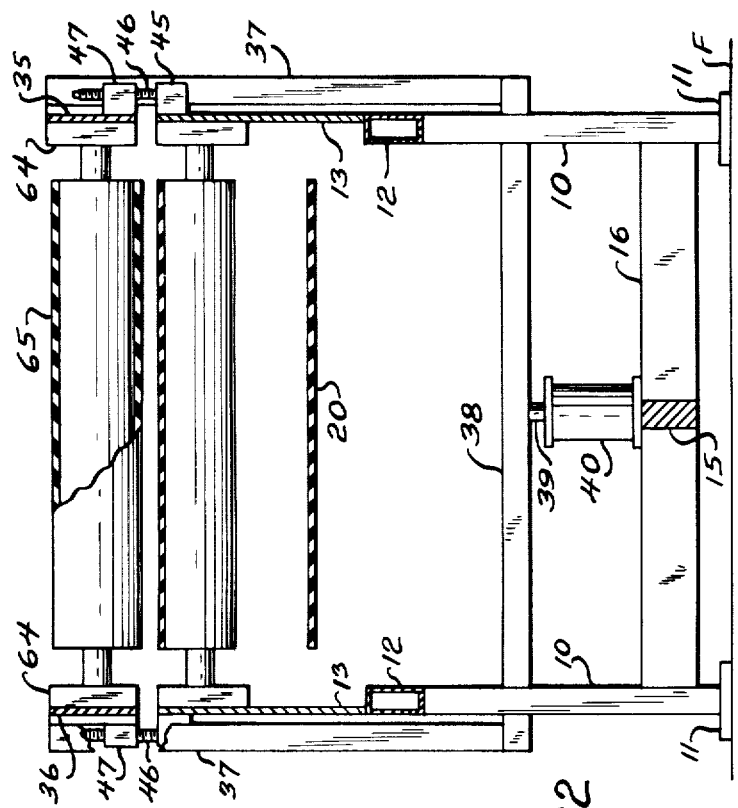
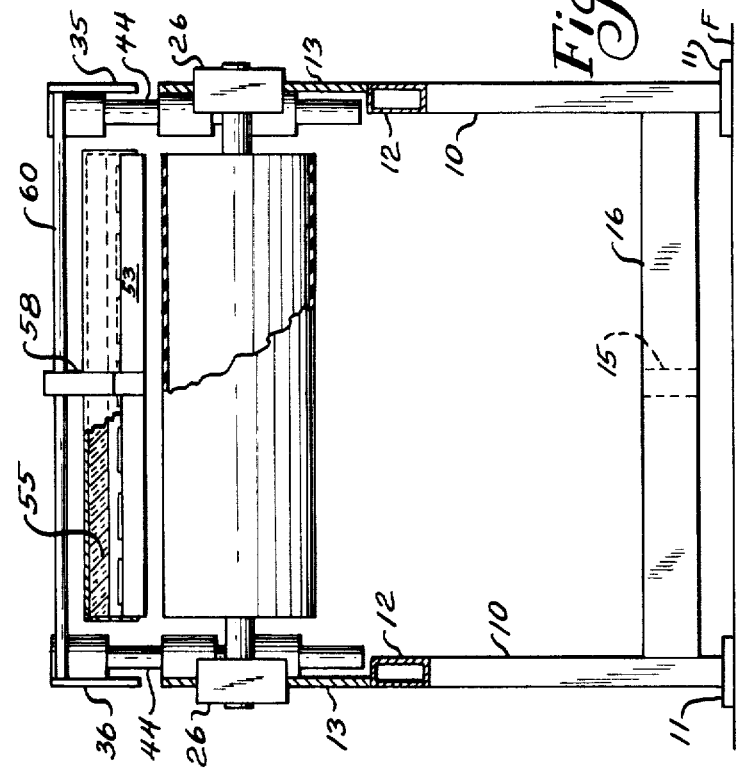
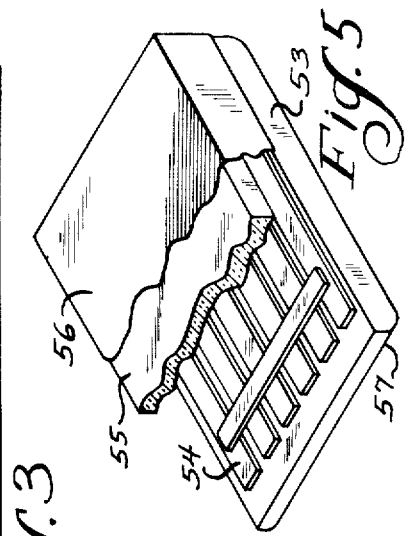
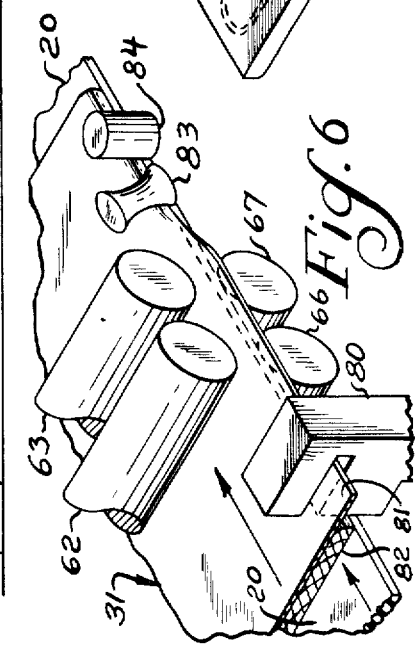

METHOD OF SURFACE LAMINATING

This is a division of application Ser. No. 723,026 filed Sept. 13, 1976, abandoned.

BACKGROUND OF THE INVENTION

The typical laminating manufacturing employs an in-line process wherein the core material and the laminate are brought together with the necessary coating equipment for application of adhesives, the necessary protective equipment exhausting solvents and drying ovens and the like. A description of such a typical in-line system is contained in the March, 1976 issue of "Wood and Wood Products" beginning at page 98.

The use of high viscosity hot melt adhesives in edge banding is disclosed in U.S. Pat. No. 3,730,823. The superior qualities of such high viscosity hot melts, those of a viscosity of 60,000 to 90,000 centipoises at about 200° C. (375°–400° F.) as measured by a Brookfield machine, are well known in the edge banding art, but have not been successfully applied to surface laminating of panels of 30" to 4' wide.

Only one machine is known to applicant for attempting the hot melt adhesive application to surface materials, this being a machine made in Italy under the name of Salgo, which incorporates a heating and roller application of hot melt adhesive to the laminate. This machine has not been successful in practical operation.

SUMMARY OF THE INVENTION

The present invention comprehends a method of laminating a laminate to a core by forming a sandwich thereof at ambient temperatures and then progressively heating the adhesive layer from the ambient temperature progressively to a tackiness and then to activating temperature is a band extending across the width of the material and progressing lengthwise of the sandwich. Immediately upon the adhesive reaching an activating temperature, the same is migrated physically into intimate contact with all of the fibers of the laminate and the core to fill all interstices and to wet out both surfaces. Immediately following the migration of the adhesive the same is cooled progressively in a band across the width of the panel and progressing lengthwise of the sandwich to reduce the adhesive to its mechanical bonding temperature. The sandwich will exit from the machine at a temperature wherein it can be physically handled by workmen. Any adhesive operable as stated may be utilized.

A unique commercial value of the present method lies in those uses wherein the factory employing the same does not have to have the equipment and controls to melt and apply hot melt adhesives. Such processes are difficult to control. In the present method, the adhesive may be sandwiched from a sheet or web of performed hot melt adhesive or it may be precoated either upon the laminate or the core.

The invention comprehends a machine and a method for utilizing high viscosity hot melt adhesives for producing a superior laminate wherein extreme attention to the conditions of lamination is not required due to the fact that the method employs conditions increasing the margin for error for securing a good laminate.

It is an object of this invention to produce a superior laminate with hot melt adhesives utilizing particularly high viscosity adhesives which offer desirable advantages, such as nontoxic, non-flamable, unlimited shelf life, a high quality of mechanical bond and a lower energy consumption during processing, as well as cleanliness of the environment surrounding the processes in the factory.

It is also an object of this invention to provide a machine which is easily maintained and operated and can provide good lamination with operators trained with ordinary factor manufacturing skills.

BRIEF DESCRIPTION OF THE DRAWINGS

FIG. 1 is a side elevational view, partially broken away and partially diagrammatic, of one machine for carrying out the method of the present invention;

FIG. 2 is an upright sectional view taken substantially along line 2—2 of FIG. 1 with certain parts of the machine removed for clarity of illustration;

FIG. 3 is an upright sectional view taken substantially along line 3—3 of FIG. 1 with parts of the machine broken away and parts removed for clarity of illustration;

FIG. 4 is a diagrammatic, broken, perspective view of the cooling shoe forming a part of the machine;

FIG. 5 is a broken, perspective view, partially diagrammatic, of the heating shoe in the machine; and FIG. 6 is a broken, substantially diagrammatic, perspective view of an additional feature capable of incorporation in the machine for producing a particular shape of laminate edge.

DESCRIPTION OF THE PREFERRED EMBODIMENT

In forming the laminate of the present invention, it is generally contemplated that a core material, such as a particle board of some 4'×8' size, would form the base of a sandwich. Over the surface of the core, a sheet of hot melt adhesive, which is non-tacky at room temperature, may be laid and cut to the size of the core. Such adhesive is available in sheet form of from 3 to 10 mil thickness and is easily handled from rolls with or without release paper wound in the spiral of the web of adhesive. A laminate material is indexed over the adhesive to complete the sandwich at room temperature.

The sandwich so formed is fed into a machine which will carry the sandwich through the various steps employed in the method for producing a mechanically bonded laminate to the core. The leading edge of the sandwich is subjected to heat conducted through the laminate to the adhesive so that the adhesive becomes tacky, which aids in holding the laminate to the core in its indexed sandwiched position. The heating is applied to a band across the width of the sandwich and progresses lengthwise of the assembly to progressively heat the adhesive to its activating temperature, in the case of a high viscosity hot melt adhesive, of between 375°–400° F. Once the adhesive and the adjacent parts of the sandwich reach the activating temperature the adhesive is physically migrated into intimate contact with both laminate and core, in a time and relationship such that the adhesive cannot lose sufficient temperature to prevent a wetting out of the adjacent laminate and core surfaces. Once the migration has occurred, a cooling of the laminate is immediately effected in a band across the sandwich progressively extending over the length of the sandwich to reduce the adhesive and adjacent sandwich surfaces to a mechanical bonding temperature of the adhesive, generally around 160° F. in the case of the high viscosity hot melt adhesive. At this point, the sandwich may be physically handled by workmen and the mechanical bond achieved is set, holding the laminate to the core in the position at which it was placed when the adhesive was caused to migrate as specified.

One machine for carrying out the method described, is illustrated in the accompanying drawings, to which reference is now made. The machine has a base frame comprising four upright legs 10 having pads 11 at their lower ends for supporting the machine upon a factory floor F so that the working parts of the machine are at a convenient height for workmen standing on the floor. Side rails 12 of structural integrity join the upper end of the legs running lengthwise of the machine in order to support upright structural plates 13 forming the main frame of the machine. The lower ends of the legs are suitably braced by longitudinal braces 14 and a central longitudinal brace 15 and cross braces 16 in order to support adequately an upper frame member.

The main frame supports a belt 20 with a high friction surface reeved about a driven roll 21 and an idler roll 22 so that the upper reach of the belt can be approximately 80" long from the idler roll 22 to the driven roll 21. A variable speed electric motor 23 drives a suitable flexible drive chain 24 to the driven roll 21. The belt is supported intermediate rolls 21 and 22 by a number of idler rolls 25 spaced apart rather evenly so that the upper reach of the belt will provide a continuous straight line support for a sandwich to be laminated. Appropriate bearing housings 26 (FIG. 2) are provided for the large rolls 21 and 22 and similar bearing blocks are provided for the rolls 25 attached to the side plates 13. Generally the belt is about 4' wide in order to accommodate 4' width material. The rollers 21, 22 and 25 are of approximate equal width with the belt. While the electric motor 23 is controllable in speed in order to change the speed of the belt travel, it is generally set at about 12' to 20' per minute, depending upon the amount of heat applied.

Infeed conveyor 30 is provided so that a sandwich 31 may be made up thereon at ambient temperatures intended to travel in the direction of the arrow 32. If convenient, the adhesive may be supplied from a roll 33 past a guide roller 34 on top of the substrate as illustrated. When the sandwich is made up, it may be propelled manually toward the machine until the belt takes over the drive thereof through the various stages of operation.

The machine has an upper frame comprising primarily a pair of side plates 35 and 36 suitably cross braced, such bracing not being illustrated. The frame is supported on the lower frame by a pair of spaced upright side support posts 37 joined by a lower cross beam 38 resting upon the rod 39 of a double acting pneumatic cylinder 40. The upper ends of the posts 37 are connected rigidly to the upper frame plates 35 and 36 respectively and the upper frame is guided relative to the lower frame by four ball-bushing vertical guides 44 approximately spaced apart longitudinally and side to side so that the upper frame may move vertically relative to the main frame under the influence of the pneumatic cylinder 40. Stops are provided to support the weight of the upper frame when air is exhausted from the cylinder and in this respect, a block 45 is secured to the plates of the lower frame so that a screw member 46 threaded through a block 47 on the upper frame plate may be adjusted to limit the lowering travel of the upper frame relative to the lower. At least a pair of such stops are provided on opposite sides of the machine.

The stops may be adjusted to support the upper frame at a position to gap the pressure rolls over the belt and back up rolls at the thickness of the core material so that the sandwich will have at least the weight of the upper frame thereon.

After the sandwich is formed either by laying up, in sequence, a core, a layer of hot melt adhesive and a laminate on the infeed conveyor 30, it may be forwarded to the machine. In some instances, the laminate may be provided in a roll form 50 and fed around an infeed smoothing roller 51 supported on pivoted hangers 52. Smoothing roller 51 may smooth out any warpage in the laminate and provide a grip between the sandwich and the conveying belt 20. Immediately as the sandwich is forwarded, it engages a heating shoe 53 diagrammatically illustrated in FIG. 5. The shoe may be formed of aluminum or a chrome plated steel having electrical strip heaters 54 therein covered by a layer of insulation 55 and a cover 56. Thermostatic controls are provided for the strip heaters. The inner approaching edge 57 of the shoe is rounded so that it may ride upward on the upper surface of the sandwich.

Referring to FIG. 2, the shoe 53 is centrally supported upon a pair of pivoted hangers 58 and 59, fore and aft of the shoe and centrally thereof, which hangers are in turn supported upon rods 60 and 61 extending between the two side plates 35 and 36 of the upper frame. These hangers permit the shoe to rise under the action of the incoming sandwich and to tilt from side to side sufficiently so that the highly polished smooth lower surface thereof will maintain good contact with the laminate of the sandwich. The contact is of light unit pressure, but sufficient to hold the laminate down and to progressively heat through the laminate to the adhesive layer raising the adhesive first to a tackiness which aids in keeping the registration and then to the activating temperature at which the adhesive may be physically migrated because of its fluid state. The hot melt adhesives contemplated are not liquid at the activating temperatures, such that they would flow by gravity, but can be migrated under physical pressure.

The physical migration is brought about by a pair of pressure rollers 62 and 63 supported in the upper frame on appropriate pillow block bearings 64 and provided with a silicon rubber coating 65 so as to not be deleteriously affected by the heat. Backup rolls 66 and 67 below the belt 20 are immediately opposite the pressure rollers. The use of a commercially available pneumatic four-way valve and a pressure regulator controlling air pressure in the cylinder 40, allows various pressures to be applied to the pressure rolls. In the present machine, 12 lbs. per sq. in. occurs on the sandwich without pressure in the cylinder. The pressure may be varied to provide up to about 400 p.s.i. on the sandwich with the use of usually available shop compressed air. It may be noted that the heating shoe lower surface when hanging at rest (FIG. 1) is slightly below the lower nip of the pressure rolls ensuring physical contact between the heating surface and the laminate on a sandwich being processed.

It is important to note the longitudinal spacing between the heating shoe and the pressure rolls when the sandwich exits the heating shoe. The adhesive will be at the activating temperature of about 375°–400° F. leaving the heating shoe and will lose a few degrees, perhaps 5, when travelling through the short 2–3" space beyond the shoe to the pressure rolls. This loss is not enough to affect the activating temperature so that the migration under the pressure rolls may occur while the temperature is in condition to wet out the facing surfaces.

As soon as the sandwich progresses beyond the pressure rolls, it is contacted by a cooling shoe 70. In FIG. 4 this shoe is shown as an aluminum shoe having water flow passages 71 therein. The shoe 70 is similarly supported upon pivoted hangers 73 and 74 from the upper frame of the machine. The shoe lower surface is polished and smooth to avoid damage to the laminate exposed surface. The shoe is movable both longitudinally and tiltable sidewise so as to conform to the surface of the sandwich. The extraction of heat is through conduction from the laminate and the adhesive therebelow. Cooling is progressively occurring across the width of the sandwich and along its length as the sandwich progresses, so that the temperature may be reduced to the mechanical bonding temperature of the adhesive as the sandwich exits. A lightweight pressure roll 75 supported on pivot hangers 76 at the exit merely ensures the feed out of the sandwich from the machine onto an outfeed support 77. The temperature is reduced sufficiently so that the sandwich may be handled by workmen. When the sandwich reaches the outfeed support, the adhesive will have set up its mechanical bond.

Some modifications of the heating shoe may occur to accommodate particular laminating materials. Some decorative surfaces are formed on very thin paper ordinarily precoated on its backside with the adhesive for securing the laminate to a base core. Similarly, metal foils, as thin as one mil thickness, can be precoated and fed from a supply roll, such as the roll 50, on to the sandwich. In each such instance, the heating shoe may comprise a heated roll of cylindrical form so that several inches of heating surface may be in contact with the metal foil or decorative paper to heat through the laminate to the adhesive. Alternatively, heat may be directed toward the adhesive so precoated upon a laminate either through the blowing of superheated air directly against the adhesive precoated on the laminate, or with the use of radiant heaters with sufficient control to provide a raising of the adhesive temperature to the activating temperature as the laminate is brought into its contact position with the core. While the heating shoe for the surface laminating described is a generally flat highly polished surface, it is thus contemplated that the shoe might be a cylindrical heated roll or the material trained about a roll with heat supplied by radiant or superheated air heat sources.

Many cabinet drawers, drawer fronts and similar furniture components may have curved edges rather than flat surfaces from side to side of the panel. Referring to FIG. 6, an auxiliary heater 80 may be provided to heat that portion 81 of the laminate extending beyond the curved edge of core 82. High viscosity hot melt adhesive ought be precoated on the laminate in this instance. When so heated to activating temperature, the adhesive will be fluid but not flowable by gravity. Contour pressure roll 83 and edge roll 84 may be mounted in the upper frame to move the laminate into conformity with the curved section of the core 82. Other contoured rollers may be utilized in the machine by appropriately mounting them in the upper frame.

In prior known laminating processes, adhesives have been raised to their activating temperature and by coating, spraying and the like, brought into contact with core and laminating surfaces which extract heat from the adhesive. In the industry, there has been a reference to "open time" as being the amount of time available during which the laminate and core may be moved relative to each other with the adhesive between them, before the adhesive would lose sufficent heat to be below its activating temperature. In known processes such open time could be as low as 1 to 3 seconds. The present invention provides a method in which open time is of no concern to the user of the method and/or machine. The adhesive in the present invention is heated in a manner that it will retain sufficient heat and remain at its activating temperature a much longer time than is needed to move the laminate relative to the core or vice versa to position the components of the sandwich into the final position desired while the adhesive is still activated. Whether the adhesive is heated through the laminate (or core) or heated by radiant or superheated air sources, which will place heat in the laminate in either case, makes "open time" of no concern since the migration will occur almost immediately. The migration of the adhesive after it is heated may thus wet out all surfaces and effectively be held in proper position until the component parts of the sandwich can be cooled to a temperature at which the adhesive will mechanically set up its bond. The light pressure supplied by the cooling element provides any warping memory of the components from taking effect during the cooling until the mechanical bond is set. In laminating thin metal foils or very thin paper laminates, as mentioned above, air cooling in ambient factory conditions may be sufficient without mechanically extracting heat from the sandwich.

The foregoing disclosure of specific embodiments is illustrative of the broad inventive concepts comprehended by the invention.

I claim:

1. A method of surface laminating sheet material to a core with mechanical bond throughout an interface of surfaces of both sheet and core comprising the steps of:
   registering at ambient temperature in sandwich form the core material, a high viscosity hot melt adhesive and a laminate,
   advancing the sandwich past a heater for progressively raising the temperature of the adhesive from ambient to tackiness to activating temperature beginning at one edge and across the width of the sandwich and proceeding lengthwise of the sandwich under low unit pressure,
   immediately advancing the sandwich under pressure rolls to migrate the adhesive when elevated to and while at said activating temperature into intimate contact with both laminate and core surfaces opposite each other in the sandwich by applying localized pressure across the sandwich urging the laminate against the core while maintaining the outer sandwich surfaces in substantial parallelism,
   immediately advancing the sandwich past a cooling station for progressively cooling the sandwich under low unit pressure following said pressurizing step to reduce the temperature of the adhesive to mechanical bonding temperature beginning at said one edge of the sandwich and proceeding lengthwise thereof and maintaining the surfaces in said parallelism during said cooling.

2. The method of claim 1 including the step of heating at least one of the laminate and core to the activating temperature of the adhesive concurrently with heating the adhesive to such temperature.

3. The method of claim 1 in which said heat application step applies heat to the laminate from the external surface thereof through the laminate to the adhesive in the sandwich.

4. In the method of claim 1, providing the cooling of the adhesive through heat conduction from the external surface of the laminate withdrawing heat from the adhesive through the laminate.

5. A method of surface laminating sheet material to a core with mechanical bond throughout an interface of surfaces of both sheet and core comprising the steps of:

provilaminate in registered relationship at ambient temperatures, heating the adhesive from ambient temperature progressively through tackiness to activating temperature under low unit pressure so that at least one of the core and laminate are similarly raised in temperature to substantially lengthen the time available for movement of sandwich components relative to the adhesive while at activated temperature, migrating the adhesive immediately while at activating temperature into intimate contact with both laminate and core surfaces opposite each other in the sandwich while maintaining the outer sandwich surfaces in substantial parallelism, and then immediately cooling the sandwich as it leaves the migrating step, reducing the adhesive to mechanical bonding temperature securing the laminate to the core in desired position, and providing said cooling step under low unit pressure.

* * * * *